(12) United States Patent
Kalhan

(10) Patent No.: US 8,437,290 B2
(45) Date of Patent: May 7, 2013

(54) MOBILE WIRELESS COMMUNICATION DEVICE WITH MULTIPLE TRANSCEIVERS

(75) Inventor: Amit Kalhan, San Diego, CA (US)

(73) Assignee: KYOCERA Corporation, Kyoto (JP)

( * ) Notice: Subject to any disclaimer, the term of this patent is extended or adjusted under 35 U.S.C. 154(b) by 175 days.

(21) Appl. No.: 13/172,506

(22) Filed: Jun. 29, 2011

(65) Prior Publication Data

US 2013/0003709 A1    Jan. 3, 2013

(51) Int. Cl.
*H04W 4/00* (2009.01)
*H04B 1/38* (2006.01)
*H04M 1/00* (2006.01)

(52) U.S. Cl.
USPC .................. 370/328; 375/219; 455/553.1

(58) Field of Classification Search .................. None
See application file for complete search history.

(56) References Cited

U.S. PATENT DOCUMENTS

| 2006/0039332 A1* | 2/2006 | Kotzin | 370/338 |
| 2007/0223516 A1* | 9/2007 | Dunn et al. | 370/462 |
| 2010/0054205 A1* | 3/2010 | Kalhan | 370/331 |
| 2012/0257609 A1* | 10/2012 | Karaoguz et al. | 370/338 |

* cited by examiner

*Primary Examiner* — Clemence Han (57) ABSTRACT

A mobile wireless communication device has multiple 802.11 transceivers. A first transceiver maintains a first 802.11 communication link in accordance with the 802.11 communication specification. A second transceiver maintains, simultaneously to the first transceiver maintaining the first 802.11 communication link, a second 802.11 communication link in accordance with the 802.11 communication specification. The first transceiver comprises first physical layer electronics for executing the physical layer functions of the first 802.11 communication link. The second transceiver comprises second physical layer electronics for executing the physical layer functions of the second 802.11 communication link. The electronics are implemented such that no portion of the first physical layer electronics forms a portion of the second physical layer electronics when the links are being simultaneously maintained.

20 Claims, 5 Drawing Sheets

MOBILE WIRELESS COMMUNICATION DEVICE WITH MULTIPLE TRANSCEIVERS

FIELD

This invention generally relates to wireless communications and more particularly to mobile wireless communication device with multiple transceivers.

BACKGROUND

Wireless communication devices such a mobile telephones, smart phones, personal digital assistants (PDAs), and tablets sometimes include the functionality to maintain multiple communication links. In conventional systems, two communication links using the same radio technology are maintained by sharing radio resources. For example, physical layer equipment is often used to maintain links. Unfortunately, such a configuration results in one or both of the links having less than optimum performance.

Therefore, there is a need for wireless communication device having multiple transceivers using the same radio technology that are not limited in performance.

SUMMARY

A mobile wireless communication device has multiple 802.11 transceivers. A first transceiver maintains a first 802.11 communication link in accordance with the 802.11 communication specification. A second transceiver maintains, simultaneously to the first transceiver maintaining the first 802.11 communication link, a second 802.11 communication link in accordance with the 802.11 communication specification. The first transceiver comprises first physical layer electronics for executing the physical layer functions of the first 802.11 communication link. The second transceiver comprises second physical layer electronics for executing the physical layer functions of the second 802.11 communication link. The electronics are implemented such that no portion of the first physical layer electronics forms a portion of the second physical layer electronics when the links are being simultaneously maintained.

DETAILED DESCRIPTION

Wireless mobile communications devices typically have a single transceiver. In those conventional devices that do have more than one transceiver, the device typically includes transceivers using different radio technologies. For example, a dual mode communication device may include a cellular transceiver for communicating with a cellular communication system and wireless local area network (WLAN) transceiver using a technology such as WiFi. In addition, where multiple transceivers are used in a single conventional device, the transceivers are implemented such that the transceivers are not distinct devices but rather share functional resources implemented in electronics including hardware and software. In other words, at least a portion of a transceiver may be used by another transceiver in the housing. Although such designs may have some advantages, these conventional mobile devices are limited in that the multiple transceivers are not capable of simultaneous operation with maximum performance allowed by the radio technologies. The embodiments discussed herein, however, allow for simultaneous operation that is not limited by such a resource sharing transceiver design. For the examples discussed herein, the wireless mobile communication device includes at least two transceivers where both transceivers include electronics for implementing Institute of Electrical and Electronic Engineers (IEEE) 802.11 physical layer functions. Although the physical layer electronics in one transceiver may be identical to the physical layer electronics of another transceiver, there are no electronic resources that are shared between the two transceivers. Therefore, each transceiver includes adequate hardware, software, and firmware for executing the physical layer functions of at least one subsection of the IEEE 802.11 communication standard. As a result, two IEEE 802.11 communication links can be simultaneously maintained without limitations on performance on either link resulting from the sharing of electronic resources. The two IEEE 802.11 communication links conform to different IEEE 802.11 subsections and, therefore, may use different modulation schemes and/or frequencies. Although the following examples discuss two trasnceivers and two communication links, the techniques can be extended to support three or more simultaneous IEEE communication links.

Figure 1:
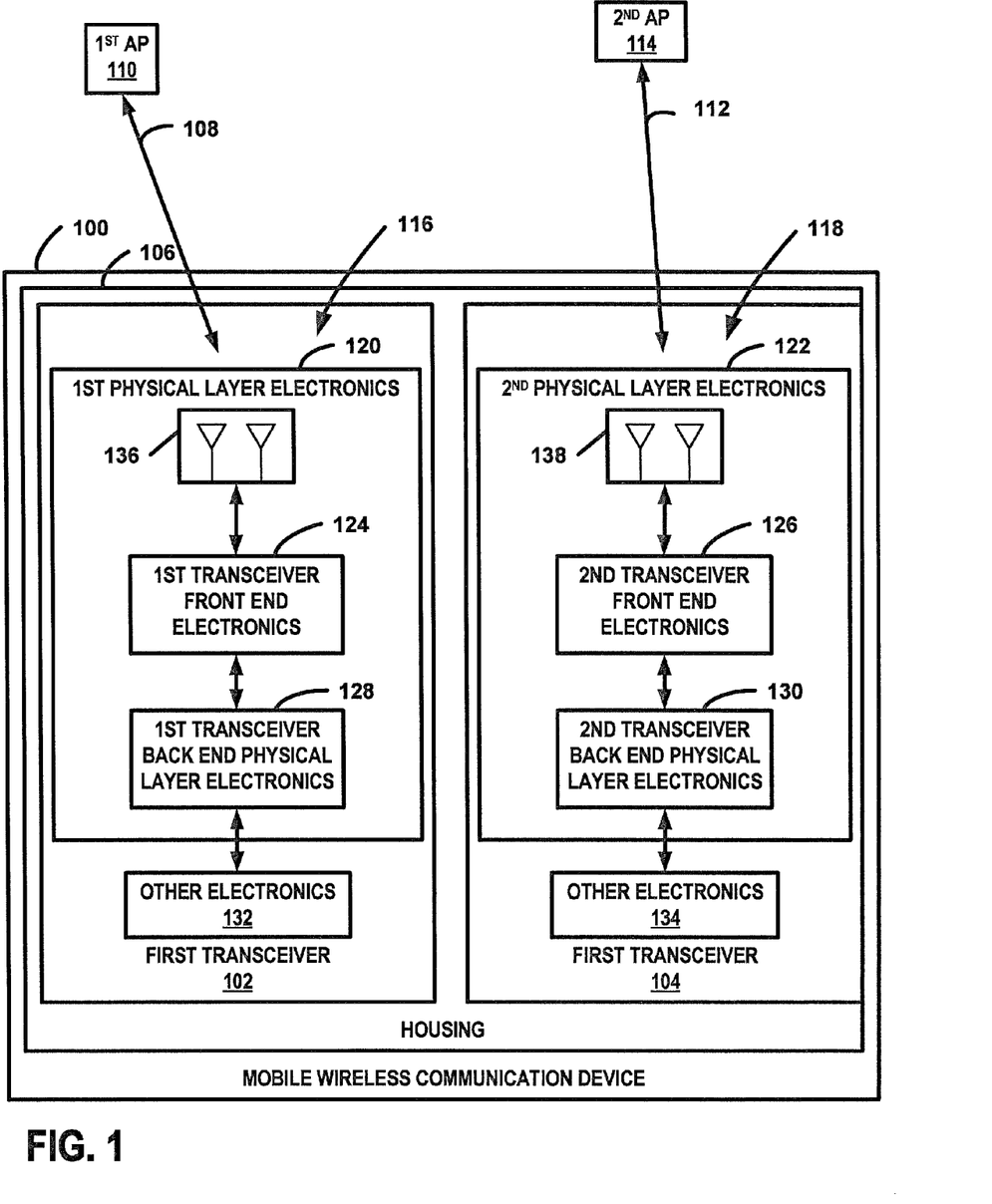
FIG. 1 is a block diagram of a mobile wireless communication device with multiple transceivers.

FIG. 1 is a block diagram of a mobile wireless communication device 100 with multiple transceivers 102, 104 where at least a portion of each transceiver 102, 104 is disposed within a housing 106. The first transceiver 102 is capable of maintaining a first IEEE 802.11 communication link 108 with a first access point 110 and the second transceiver 104 is capable of simultaneously maintaining a second IEEE 802.11 communication link 112 with a second access point 114. One or both of the communication links may be to a Wireless Local Area Network (WLAN) or a Personal Area Network (PAN). The transceivers 102, 104 use the same radio technology since both links are in accordance with the IEEE 802.11 specification. Since the mobile wireless communication device 100 includes separate electronics for implementing at least the physical layer of each communication link 108, 112, the mobile wireless communication device 100 can simultaneously communicate with two different access points 110, 114 using the same radio technology without limitations due to sharing of radio resources.

A radio technology sometimes referred to as an air interface or radio access technology (RAT) is any form of wireless communication that may be utilized to transmit, receive wireless signals conveying audio signals (including voice signals), data signals or a combination of voice and data signals without requiring a hard-wired or other physical connection. Radio technologies include cellular radio technologies, Wireless Local Area Network (WLAN) radio technologies, and personal area network (PAN) radio technologies and include examples such as cdma2000 (covering IS-2000, IS-856, and IS-95 standards), Wideband-CDMA (W-CDMA), CDMA2000 1x (covering IS-2000 and/or IS-95), A CDMA2000 1xEV-DO (covering IS-856), Universal Mobile Telecommunications System (UMTS) (implementing W-CDMA), TDMA (implementing Global System for Mobile Communications (GSM) including 2G, 3G or 4G, personal communication system (PCS) communication technologies, WLANs such as WiFi, wireless metropolitan area networks (WirelessMAN), such as WiMAX, and PAN technologies such as Bluetooth.

Radio technologies are often defined by a standard or specification that provides rules on frequencies, timing, messages, and communication exchanges such as acknowledgment messaging and other limitations or requirements. A communication standard or specification includes rules and protocols that can be defined in terms of layers. A layer is a collection of similar functions that provides services to a higher layer and receives services from a lower layer. On each layer, an instance provides services to the instances at the layer above and requests service from the layer below. The IEEE 802.11 communication layers are discussed in further detail below with reference to FIG. 2.

For the examples herein, the radio technology used by both transceivers 102, 104 is WLAN. Each transceiver 102, 104 communicates in accordance with one of the Institute of Electrical and Electronic Engineers (IEEE) 802.11 communication standard subsections. The IEEE 802.11 specification has several subsections where each subsection is identified in the specification with a unique letter or letters. Some examples of 802.11 subsections include 802.11a, 802.11b, 802.11g, 802.11n, and expected subsections such as 802.11ac and 802.11ad. The IEEE 802.11 subsection may be a currently defined subsection as currently defined or as amended after this writing. Also, the IEEE 802.11 subsection may be a new subsection defined after this writing. Examples of currently defined IEEE 802.11 subsections include 802.11 1997 (802.11 legacy), 802.11a, 802.11b, 802.11g, and 802.11n. Each subsection may use different modulation techniques. For example 802.11 FHSS uses Frequency-hopping GFSK modulation, 802.11 DS uses Direct-Sequence Spread-Spectrum (DSSS) with DPSK modulation, 802.11a uses OFDM and a later version uses a combination of DSSS+OFDM.

Each transceiver includes electronics 116, 118 for processing signals in accordance with the protocols and rules of the IEEE 802.11 specification. The electronics 116, 118 may include a combination of hardware and code running on the hardware and may include electrical components, processors, logical gates, integrated circuits, memory devices, wires, connectors, and other known electrical elements, components and code. At least some portions of the electronics 116, 118 may be identified as implementing a particular layer of the communication specification. For the examples herein, each transceiver 102, 104 includes hardware and code for implementing the physical layer functions. These electronics are referred to as the physical layer electronics 120, 122. This hardware and code may be any combination of hardware such as electronic components, logical gates, and integrated circuits (ICs) and code such as firmware and/or software operating on a processing device such as processor or microprocessor, for example. The physical layer electronics 120, 122 for each transceiver 102, 104 at least include front end transceiver electronics 124, 126 and back end physical layer electronics 128, 130. Each transceiver typically also includes Media Access Control (MAC) layer electronics (not shown) as well as other electronics 132, 134 facilitating operation of the transceiver. The physical layer electronics 120, 122 also typically include at least one antenna accessible by each transceiver. For the embodiments discussed herein, each transceiver has access to a Multiple Input Multiple Output (MIMO) interface 136, 138 that includes a plurality of antennas. Therefore, for the example, the first transceiver electronics 116 include first physical layer electronics and other electronics 132, where the first physical layer electronics include a MIMO interface 136, first transceiver front end electronics 124, and first transceiver back end physical layer electronics 128. The second transceiver electronics 118 include second physical layer electronics 122 and other electronics 134, where the second physical layer electronics 122 include a second MIMO interface 138, second transceiver front end electronics 126, and second transceiver back end physical layer electronics 130.

The first transceiver 102 maintains the first wireless communication link 108 with the first access point 110 by transmitting and receiving wireless signals in accordance with a communication specification. As explained above, the communication specification is any one of the subsections of the IEEE 802.11 communication specification. The subsection may be an existing subsection currently defined by the specification or a subsection that is modified or added to the specification after the filing of this patent application. Downlink signals are received from the first access point 110 through the first MIMO interface 136 and processed by the first transceiver front end electronics 124. The first MIMO interface 136 includes at least two antennas and may be dynamically adjustable to select antennas that are used by the first transceiver 102 for reception and/or transmission. The first transceiver front end electronics 124 includes at least hardware for receiving and transmitting signals. In some situations, the electronics 124 may also run code, such as firmware and/or software, on the hardware to facilitate some of the front end functions. The receiver portion of the first transceiver front end electronics 124 processes incoming downlink signals to generate baseband signals and, therefore, will typically include low noise amplifiers (LNAs), demodulators, mixers and filters as well as other receiver front end components.

The base band signals are provided to the first transceiver back end physical layer electronics 128 for further processing. The first physical layer electronics 124 include hardware and/or code for performing the other physical layer processing in accordance with the communication specification. For reception, the physical layer electronics 120 perform processing such as receiving RF signals through an antenna, RF filtering and low noise amplification, analog to digital conversion, removing cyclic prefix, Fast Fourier Transform (FFT) processing, channel estimation/equalization, MIMO processing, de-spreading, descrambling, demodulation, and channel decoding. Although the allocation of functions may assigned differently between the front end electronics 122 and the back end physical layer electronics 132 depending on the particular implementation, typically functions such as RF reception, filtering, low noise amplification, and demodulation are performed by the receiver front end while other physical layer functions are performed by the back end electronics 128. The information generated from the first physical layer electronics 120 is further processed by the other electronics 132 in accordance with the other layers of 802.11 communication stack. For example, the other electronics 132 perform the MAC layer tasks as well as other data link layer processing such as logical link control in accordance with the 802.11 communication specification.

Information to be transmitted from the first transceiver 102 is processed by the other electronics 132 before being provided to the first physical layer electronics 120. Other layer processing such as MAC layer processing is performed on the raw data to be transmitted before the first physical layer electronics 120 further processes the data in accordance with the communication specification. For transmission, the physical layer electronics 120 perform processing such as channel coding, modulation, spreading, scrambling, precoding, MIMO processing, reference signal insertion, resource mapping, Inverse Fast Fourier Transform (IFFT) processing, adding cyclic prefix, digital to analog conversion (DAC), radio frequency (RF) filtering and amplification, and RF transmission through an antenna. The allocation of the some of the physical layer functions between the first transceiver front end electronics 124 and the first transceiver back end physical layer electronics 128 may depend on the particular implementation. Accordingly, physical layer functions not performed by the first transceiver front end electronics 124 or the first MIMO interface 136, are performed by the first transceiver back end physical layer electronics 128. As discussed below, the physical layer electronics may be supported electronics that are not part of the physical layer electronics. These support electronics provide shared resources such clocks and power management to both transceivers 102, 104 without limitations on transceiver performance during simultaneous communication links.

After processing by the first transceiver back end physical layer electronics 128, the data is modulated, amplified, filtered and otherwise prepared for wireless transmission by the first transceiver front end electronics 124. Wireless signals conveying the transmission data are transmitted by the first transceiver front end electronics 124 through the first MIMO interface 136.

The second transceiver 104 maintains the second wireless communication link 112 with the second access point 114 by transmitting and receiving wireless signals in accordance with the IEEE communication specification. For the examples, the communication specification is defined by a subsection of the IEEE 802.11 communication specification that is different from the IEEE 802.11 subsection used by the first transceiver 102. In some situations, both transceivers 102, 104 may communicate in accordance with the same subsection. In either case, however, the physical layer of both links is defined by the IEEE communication specification. Downlink signals are received from the second access point 114 through the second MIMO interface 138 and processed by the second transceiver front end electronics 126. The second MIMO interface 136 includes at least two antennas and may be dynamically adjustable to select antennas that are used by the second transceiver 104 for reception and/or transmission. The second transceiver front end electronics 126 include at least hardware for receiving and transmitting signals. In some situations, electronics may also run code, such as firmware and/or software, to facilitate some of the front end functions. The receiver portion of the second transceiver front end electronics 126 processes incoming downlink signals to generate baseband signals and, therefore, will typically include low noise amplifiers (LNAs), mixers and filters, ADC as well as other receiver front end components.

The base band signals are provided to the second transceiver physical layer back end electronics 130 for further processing. The second transceiver physical layer back end electronics 130 include hardware and code for implementing the additional physical layer processing in accordance with the 802.11 communication specification. The second physical layer electronics 122, therefore, perform functions such as receiving RF signals through an antenna, RF filtering and low noise amplification, analog to digital conversion, removing cyclic prefix, FFT processing, channel estimation/equalization, MIMO processing, de-spreading, descrambling, demodulation, and channel decoding. The information generated from the second physical layer electronics 122 is further processed by the other electronics 134. For example, the other electronics 134 perform the MAC layer tasks as well as other data link layer processing such as logical link control in accordance with the 802.11 communication specification.

Information to be transmitted from the second transceiver 104 is processed by the other electronics 134 before being provided to the second physical layer electronics 122. Other layer processing such as MAC layer processing is performed on the raw data to be transmitted before the second physical layer electronics 122 further processes the data in accordance with the communication specification. For transmission, the second physical layer electronics 122 perform processing such as channel coding, modulation, spreading, scrambling, precoding, MIMO processing, reference signal insertion, resource mapping, Inverse Fast Fourier Transform (IFFT) processing, adding cyclic prefix, digital to analog conversion (DAC), radio frequency (RF) filtering and amplification, and RF transmission through an antenna. The allocation of the some of the physical layer functions between the second transceiver front end electronics 126 and the second transceiver back end physical layer electronics 130 may depend on the particular implementation. Accordingly, physical layer functions not performed by the second transceiver front end electronics 126 or the second MIMO interface 138, are performed by the second transceiver back end physical layer electronics 126.

After processing by the second transceiver back end physical layer electronics 126, the data is modulated, amplified, filtered and otherwise prepared for wireless transmission by the second transceiver front end electronics 126. Wireless signals conveying the transmission data are transmitted by the second transceiver front end electronics 126 through the second MIMO interface 138.

The first transceiver 102 can maintain the first communication link 108 at the same time the second transceiver 104 maintains the second communication link 112 without a limitation on the quality of the link resulting from sharing of electronics and/or processing resources. For the examples, no portion of the first physical layer electronics 120 is part of the second physical layer electronics 122 when the communication links 108, 112 are being simultaneously maintained. Therefore, the back end physical layer electronics and the front end electronics do not share any components between the two transceivers. In some situations, however, portions of the first physical layer electronics 120 may include portions of the other electronics 132 in the first transceiver 102 and second physical layer electronics 122 may include portions of the other electronics 134 in the second transceiver 104. In some situations, some electronic resources of the physical layer electronics may be configured to be used by either transceiver. For example, in some implementations, a first subset antennas of an array of antennas may be dedicated to the first transceiver to form the first MIMO interface and a second subset of antennas may be dedicated to the second transceiver to form the second MIMO interface for one time period where the second subset may form the first MIMO interface and the first subset may form the second MIMO interface during a second time period. However, no physical layer electronic resource is used simultaneously by both transceivers.

As discussed above, processing of other communication layers is performed by other electronics 132, 134 in each transceiver 102, 104. In some situations, portions of the other electronics 132 in the first transceiver 102 may be part of the other electronics 134 in the second transceiver 104. Accordingly, electronics and processing resources may be shared by other layer processing in the transceivers 102, 104 in some situations.

As discussed above, the electronics include hardware and software. In some situations, the physical layer electronics and the MAC layer electronics are at least partially implemented by running code on a general purpose processor or on Digital Signal Processor. In some circumstances, the electronics 116 of the first transceiver 102 and the electronics 118 for the second transceiver 104 may be implemented on a single processor and the first physical layer electronics 120 and the second physical layer electronics 122 may, therefore, be disposed on the same ASIC or IC. Accordingly, at least a portion of the first physical layer electronics 120 and at least a portion of the second physical electronics 122 may be contained within a single housing or package, or on the same circuit board even though they are discrete electronic resources.

In the examples herein, the second physical layer electronics 122 are a replica of the first physical layer electronics 120. At a minimum, the first physical layer electronics 120 and the second physical layer electronics 122 can both perform 802.11 physical layer processing.

Therefore, the first physical layer electronics 120 provide physical layer electronic resources for executing the physical layer functions of the first transceiver 102 and the second physical layer electronics 122 provide physical layer electronic resources for executing the physical layer functions of the second transceiver 104. The resources may be any bandwidth, component, power, processing, or time resource that contributes to implementing the physical layer functions. Accordingly, by using multiple transceivers where each includes dedicated electronics for providing the physical layer resources, the performance of the communication link provided by a transceiver is not limited by the physical layer functions performed in other transceivers.

At least portions of the first transceiver 102 and the second transceiver 104 are disposed within the housing 106. In some situations, portions of one or both of the transceivers 102, 104 may be located outside of the housing 106. For example, antennas in the MIMO interface may be located on the outside of the housing 106 to improve performance. At least the first transceiver front end electronics 124, the second transceiver front end electronics 126, first back end physical layer electronics 128 and the second back end physical layer electronics 130 are contained within the housing 106 in the examples herein.

Since the mobile wireless communication device 100 may have any of numerous form factors and configurations, the housing 106 may have any of several shapes and sizes. For example, the mobile wireless communication device 100 may be smart phone, personal data assistant (PDA) or other hand held communication device where the housing 106 has shape and size that allows the device to be held in the hand of user. In the exemplary embodiment, the mobile wireless communication device 100 is a wireless tablet. Tablets typically include touch screens that are larger than six inches by six inches. The housing of a tablet is therefore larger than the housings of cellular phones and PDAs.

Figure 2:
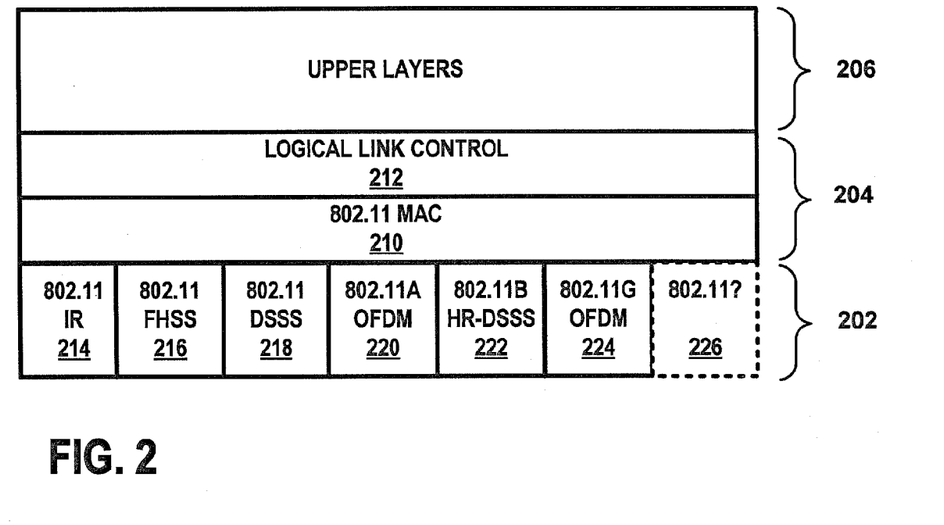
FIG. 2 is a block diagram of an IEEE 802.11 communication layer stack.

FIG. 2 is a block diagram of an IEEE 802.11 communication layer stack 200. The IEEE 802.11 communication layers include a physical layer 202, a data link layer 204 and upper layers 206. The data link layer includes and 802.11 Media Access Control (MAC) layer 208 and Logical Link Control layer 210 which is defined by IEEE 802.2. The 802.11 MAC layer uses Carrier Sense Multiple Access/Collision Avoidance (CSMA/CA) scheme and provides addressing and channel access control mechanisms that facilitate communication with several terminals or network nodes within a multi-point network such as Local Area Network (LAN). An 802.11 transceiver may operate in accordance with any of the several defined physical layer schemes of the 802.11 set of standards of the physical layer 202 which include 802.11 Infrared (IR) 214, 802.11 Frequency Hopping Spread Spectrum (FHSS) 216, Direct Sequence Spread Spectrum (DSSS) 218, 802.11a Orthogonal Frequency Division Multiplexing (OFDM) 210, 802.11b High Rate Direct Sequence Spread Spectrum (HR-DSSS) 222, 802.11g OFDM 224 variations. As discussed above the 802.11 specification and revisions are publicly available at http://standards.ieee.orq/about/get/802/802.11.html and incorporated by reference herein. A block 226 with dashed lines is shown in FIG. 2 to illustrate that the physical layer schemes may include future variations not defined at the time of this filing.

Each transceiver 102, 104 is capable of at least communicating in accordance with one of the physical layer schemes 214, 216, 218, 220, 222, 224, 226. In the examples discussed herein, each transceiver 102, 104 can be configured to communicate in accordance with any of several physical layer schemes. For example, both transceivers may have the capability of establishing a physical communication link that conforms to either the 802.11 legacy schemes, the 802.11a, 802.11b or 802.11g physical layer schemes.

The transceivers may establish communication links 108, 112 that conform to the same physical payer scheme or to different schemes. For example, the first communication link 108 may be a 802.11b link and the second communication link 112 that is simultaneously maintained with the first link 108 may be a 802.11g link. Accordingly, the frequency and modulation used for the two links 108, 112 may be different. For example 802.11 FHSS uses Frequency-hopping GFSK modulation at a frequency 2.4 GHz, 802.11 DSSS uses Direct-Sequence Spread-Spectrum (DSSS) with DPSK modulation at a frequency of 2.4 GHz, 802.11a uses OFDM at frequencies of 3.7 GHz and 5.0 GHz. and other physical layer schemes uses a combination of DSSS and OFDM.

Figure 3:
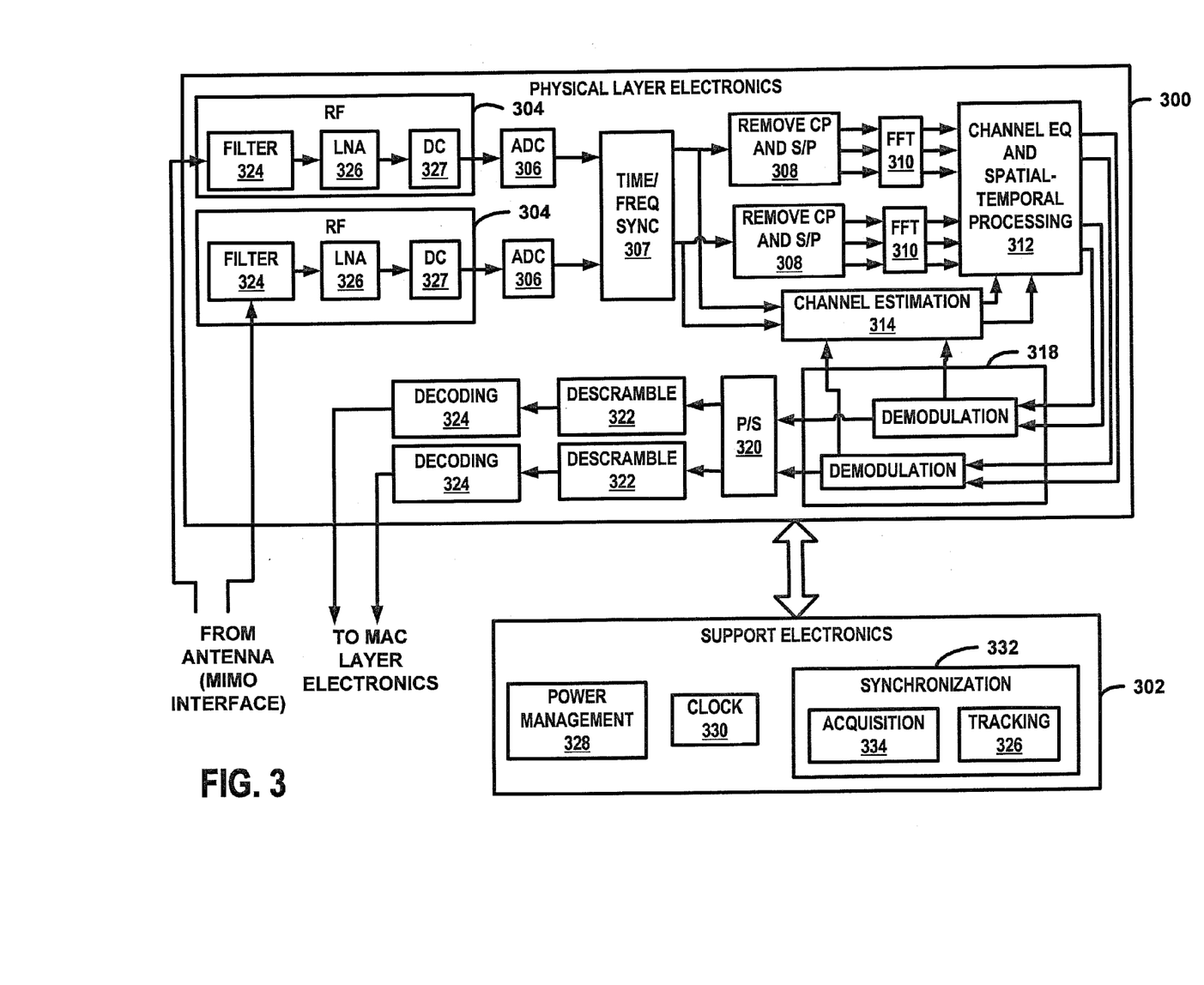
FIG. 3 is block diagram of an example of the receiver portion of the physical layer electronics and supporting electronics suitable for use in both transceivers.

FIG. 3 is a block diagram of an example of the receiver portion 300 of the physical layer electronics 120, 122 and supporting electronics 302 suitable for use in both transceivers 102, 104. The physical layer electronics receiver portion 300 may be implemented using any combination of code and hardware and with other combinations of functional blocks. For example, some functional blocks described with reference to FIG. 3 may be omitted and other may be added to the receiver portion depending on the particular implementation. Further, the order of the functional blocks may be varied. For the example of FIG. 3, the receiver portion 300 includes RF electronics 304 and an analog to digital converter (ADC) 306 for each antenna, time and frequency synchronization electronics 307, cyclic prefix removing and serial to parallel processing electronics 308, Fast Fourier Transform (FFT) electronics 310, channel equalization and spatial-temporal processing electronics 312, channel estimation electronics 314, demodulation electronics 316, descrambling electronics 318, and channel decoding electronics 322. The RF electronics 304 include filtering, amplification and frequency shifting functions where these functions are represented by a filter 324, a low noise amplifier (LNA) 326 and a down converter 327 in the example. An incoming RF signal is received through one or more antennas. The signal from each antenna is filtered, amplified, down converted and then converted to a digital signal. In the interest of brevity, processing for only two antenna outputs is shown in FIG. 3 although any number may be shown. Each antenna signal is filtered by a filter 324, amplified by the LNA 326, and down converted by a down converter 327 in accordance with known techniques. The filter 324 and LNA 326 may be distributed or integrated in different ways depending on the particular implementation. The ADC 306 converts the filtered and amplified RF analog signal to a digital signal which is forwarded to the time and frequency synchronization electronics 307.

The time and frequency synchronization electronics 307, supported by the support electronics 302, apply time and frequency synchronization to acquire and track the signal. As is known, the receiver has to track the signal continuously once it has been acquired. Resources for performing the acquisition task can sometimes be shared between multiple receivers since the resources may not be needed simultaneously. Some resources used for tracking, however, may not be shared since sharing of such resources may result in less than optimum receiver performance. These unshared tasks are performed by resources within the physical electronics of both transceivers and are, therefore, specifically assigned to each receiver. Accordingly, unshared tracking resources are implemented within the time and frequency synchronization electronics 307 and shared tracking resources are implemented in the support electronics 302.

The cyclic prefix added by the access point during the processing of the signal before transmission is removed by the cyclic prefix removing and serial to parallel electronics 308 which also converts the serial data stream corresponding to each antenna into parallel data streams. As is known, the size of the FFT and the number of parallel data streams is selected based on the system bandwidth of the signal. The FFT is applied to the digital signal by the FFT electronics 310 prior to channel equalization spatial-temporal processing. In accordance with known techniques, the channel equalization electronics 312 working with the channel estimation electronics 314 provide an estimate of the amplitude and phase shift caused by the wireless channel from the available pilot information and removes the effect of the wireless channel to facilitate subsequent symbol demodulation. In accordance with known, techniques, therefore the electronics 312, 314 compensate for signal distortion in the wireless communication channel. The spatial-temporal processing portion of the electronics 312 further process the data streams by applying complex-valued weights to the N-point output of the FFT in accordance with MIMO techniques. The types of channel equalization, and spatial temporal processing depends on the particular implementation. Examples of these types of functions include Decision-directed Channel estimation, DFT based processing, and Blind Channel Estimation. After channel processing by the electronics 312, the demodulator 318 demodulates the data streams and provides feedback to the channel estimation electronics 314. The parallel to serial electronics 320 combine the parallel data streams to serial data streams. The descrambling electronics 322 descramble the signal to reverse the scrambling applied by the access point. The descrambled signal is decoded by the decoding electronics 324 to generate data that is forwarded to the MAC layer electronics.

The receiver portion of the physical layer electronics may include other functions not described in FIG. 3. For example, de-spreading electronics may be required apply the appropriate PN sequence to counteract the effect of the PN sequence applied by the access point to spread the signal.

In order to operate, the functions of the physical layer receiver require supporting electronics 302 that can be shared between the functional blocks within the receiver, between the physical layer and other electronics, and/or between electronics of the transceivers. Sharing of the supporting electronics resources does not limit the performance of the physical layer electronics. Accordingly, for the examples herein, the functions implemented as part of the supporting electronics can be shared without limitation on performance. If any supporting function would limit performance of the physical layer if shared between any other portion of the device, the function is reproduced as part of each physical layer electronics within each transceiver.

For the example, the supporting electronics 302 include power management electronics 328, timing electronics such as a clock circuit 330, and communication synchronization electronics 332. The power management electronics 328 provide power to the various circuits and devices and may include power sources such as batteries, voltage regulators, current limiters, and other power filtering and control functions which maintain the appropriate power level and quality to each circuit or device.

The clock circuit 328 may include a clock device such as an oscillator as well as clock dividing circuits. The appropriate clock signal is provided to the circuits that require a clock in accordance with known techniques.

The synchronization electronics 332 facilitate the acquisition and tracking of the received signal. As explained above, in many situations, at least some of these functions can be shared by transceivers without limiting performance of the transceivers. As is known, algorithms are applied to determine the reference point in time and frequency in order to acquire signals. Accordingly, time and RF synchronization may include determining sample frequency (SF) offset estimation and correction, phase noise estimation and correction, and channel estimation. Signal tracking typically includes RF, SF, phase noise and channel tracking after the signal has been acquired. For the example of FIG. 3, both the acquisition electronics 334 and the tracking electronics 326 are part of the supporting electronics 302 and are shared. In some situations, at least portions of the tracking electronics 326 are reproduced for each transceiver's physical layer electronics.

Signal acquisition typically includes five main steps: 1) coarse time synchronization; 2) RF local oscillator frequency offset estimation; 3) frequency offset correction; 4) fine time synchronization; and 5) frequency offset estimation. For the example of FIG. 3, these steps are performed in the support electronics 302. The output of this process is used to perform time and frequency offset compensation to the incoming signal by the time and frequency electronics 307.

As explained above, tracking may also be performed by the supporting circuits. Tracking involves frequent updating steps and may not require as much computation at initial acquisition. Therefore, some of the resources for tracking can be shared with between transceivers.

Figure 4:
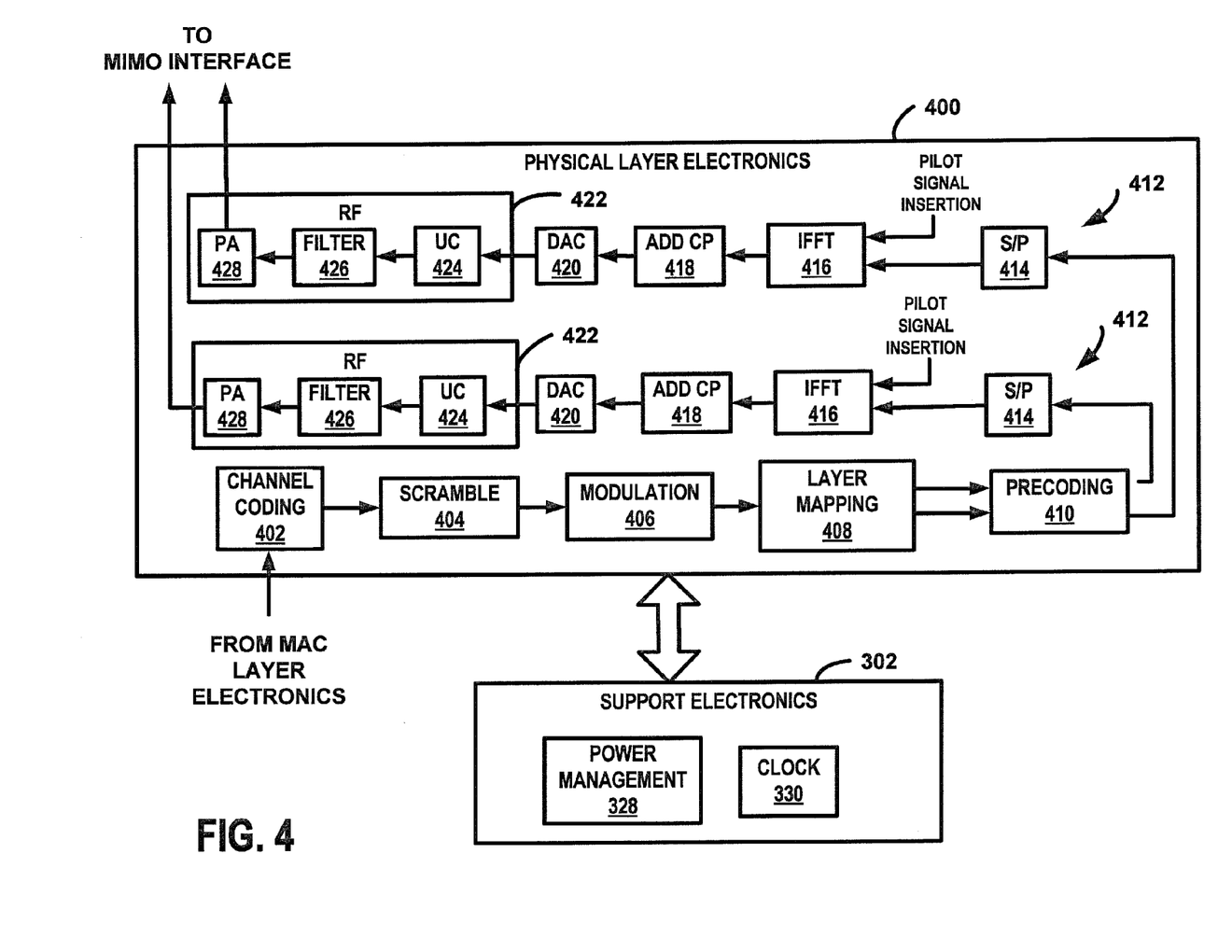
FIG. 4 is a block diagram of an example of the transmitter portion of the physical layer electronics and supporting electronics suitable for use in both transceivers.

FIG. 4 is a block diagram of an example of the transmitter portion 400 of the physical layer electronics and supporting electronics suitable for use in both transceivers. The physical layer electronics receives data signals from the MAC layer electronics and function in accordance with known techniques. The various function of the physical layer electronics are described in the functional blocks. Those skilled in the art will recognize the various ways to implement the functions in electronics of the physical layer electronics using devices, circuits and/or code, for example. A group of data bits can be taken from the data stream received from the MAC layer. This stream can be multiplexed into multiple streams which can be later coded and modulated to form multiple codewords. In a simple case, one stream is assumed and channel coding is applied to the signals (data stream) received from the MAC layer by the channel coding function 402. Most common channel coding is Turbo Coding or LDPC.

The channel coded signals are scrambled and modulated by the scramble function 404 and the modulation function 406, respectively.

After coding and modulation layer mapping is performed. Typically one-to-one mapping can be used for codeword. In the case where the number of layers is greater than codewords to be transmitted, however, a layer mapping function 408 can assign same codeword to two or more layers. The number of layer depends on the number of RF transmission chains and antennas.

The precoding function 410 is used for Spatial-temporal processing. During precoding, a complex-valued weighting is applied to each output of the layer-mapping function 408. These weights are based on MIMO techniques that are used for transmission.

The output of the precoding function 410 is provided to the transmission chains 412. In the interest of clarity and brevity, only two transmission chains for transmission through two antennas are shown for the example of FIG. 4. Any number of antennas and chains can be used, however. The resulting precoded signal is converted from a serial to parallel signal in the S/P function 414 for each transmission chain.

A pilot signal is inserted into the parallel data and Inverse Fast Fourier Transform (IFFT) processing is applied by the IFFT function 416. A cyclic prefix is added by the cyclic prefix function 418. The digital to analog converter (DAC) 420 converts the resulting signal to an analog which is processed by the RF electronics 422 before transmission through an antenna. An up converter 424 shifts the signal to the appropriate higher frequency, one of more filters 426 filter the signal, and the power amplifier amplifies the signal. The filtering may be performed at various pointed through the RF transmission chain. The resulting amplified and filtered signal is forwarded to the MIMO interface and the transmitted through an antenna.

Figure 5:
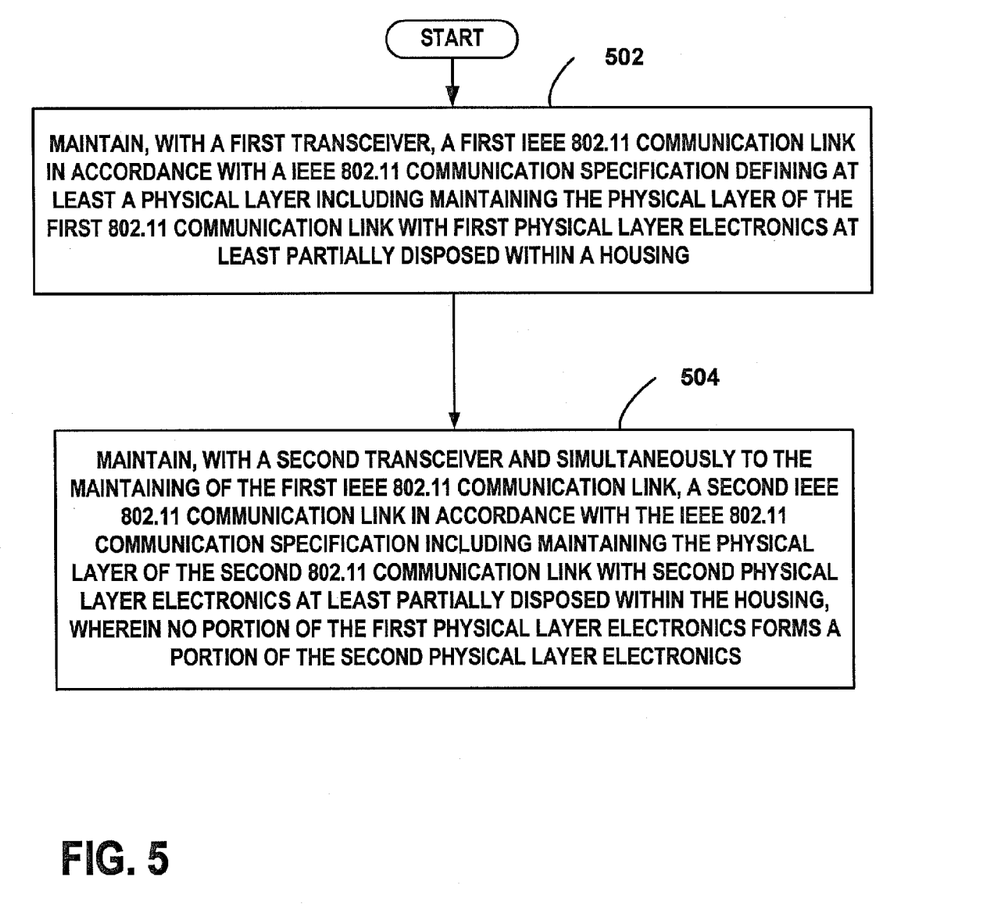
FIG. 5 is a flow chart of method of simultaneously maintaining multiple IEEE 802.11 communication links with a mobile wireless communication device.

FIG. 5 is a flow chart of a method of simultaneously maintaining multiple IEEE communication links to a mobile wireless communication device. The method is performed by the mobile wireless communication device.

At step 502, the first transceiver maintains the first IEEE 802.11 communication link in accordance with the IEEE 802.11 communication specification defining at least a physical layer. First physical layer electronics in the first transceiver maintain the physical layer of the first 802.11 communication link where the first physical layer electronics are at least partially disposed within the housing.

The receiver portion of the physical layer of the first IEEE communication is maintained using at least first receiver radio frequency electronics, a first analog to digital converter, first channel estimation electronics, and first demodulation electronics. The first receiver radio electronics include at least first filtering electronics, first low noise amplifier electronics and first frequency down conversion electronics. As described above, the first physical layer electronics also include first transmitter radio frequency electronics, a first digital to analog converter, and first modulation electronics At step 504, a second transceiver maintains, simultaneously to the maintaining of the first IEEE 802.11 communication link, a second IEEE 802.11communication link in accordance with the IEEE 802.11 communication specification. Second physical layer electronics maintaining the physical layer of the second IEEE communication link where the second physical layer electronics are at least partially disposed within the housing. No portion of the first physical layer electronics forms a portion of the second physical layer electronics. The receiver portion of the physical layer of the second IEEE communication link is maintained using second receiver radio frequency electronics, a second analog to digital converter, second channel estimation electronics, and second demodulation electronics. As discussed above, the second radio frequency electronics include second filtering electronics, second low noise amplifier electronics and second frequency down conversion electronics. The transmitter portion of the second physical layer electronics includes second transmitter radio frequency electronics, a second digital to analog converter, and second modulation electronics.

Although some signal acquisition functions may be performed by dedicated resources within the physical layer electronics of each transceiver, signal acquisition functions are executed by supporting electronics that are shared between both transceivers. No portion of the supporting electronics is part of the first physical layer electronics or the second physical layer electronics. In some situations signal tracking functions may also be performed by the supporting electronics that are shared.

Therefore, the mobile wireless communication device includes multiple 802.11 transceivers where at least the physical layer electronics are replicated in each transceiver to avoid performance limitations of sharing physical layer resources. Any number of 802.11 transceivers may be at least partially enclosed in the housing of the mobile wireless communication device. Accordingly, any number of dedicated 802.11 physical layer electronics may be used to simultaneously maintain the physical layers of multiple 802.11 communication links. Any of numerous combinations of communication links may be established and maintained depending on the particular implementation and use. One example of a combination includes maintaining a link in accordance with IEEE 802.11b and simultaneously maintaining a link in accordance IEEE 802.11g. Another example of a combination includes maintaining a link in accordance with IEEE 802.11a and simultaneously maintaining a link in accordance IEEE 802.11g. Simultaneously utilizing links defined by different 802.11 subsections defining for different frequency bands provides additional advantages in some circumstances. For example, the first communication link may be an IEEE 802.11 link in accordance with a 802.11 subsection defined for use in the 2.4 GHz band and the second IEEE 802.11 communication link may be in accordance with a 802.11 subsection defined for use in the 60 GHz band. An example of an IEEE 802.11 subsection defined for use in the 60 GHz band includes the currently being developed IEEE 802.11ac specification. Due to propagation properties at these frequencies, the first link may be relatively long and the second link may be relatively short. The first link, for example, may be to an access point that is several meters away in a separate room or building while the second link may be to a target transceiver only a few meters away. Such a scenario is useful where the mobile wireless communication device is a tablet, the first communication link is to a WLAN access point located in a different room within a home, and the second communication link is to a 802.11 transceiver connected to a large display, such as an HDTV, within line of sight of the tablet. The user can simultaneously download content, such a movie, through the first communication link and forward the content to the 802.11 transceiver connected to the HDTV.

Clearly, other embodiments and modifications of this invention will occur readily to those of ordinary skill in the art in view of these teachings. The above description is illustrative and not restrictive. This invention is to be limited only by the following claims, which include all such embodiments and modifications when viewed in conjunction with the above specification and accompanying drawings. The scope of the invention should, therefore, be determined not with reference to the above description, but instead should be determined with reference to the appended claims along with their full scope of equivalents.

What is claimed is:

1. A mobile wireless communication device comprising:
a first transceiver configured to maintain a first Institute of Electrical and Electronic Engineers (IEEE) 802.11 communication link in accordance with a IEEE 802.11 communication specification defining at least a physical layer, the first transceiver comprising first physical layer electronics configured to maintain the physical layer of the first 802.11 communication link;
a second transceiver configured to maintain, simultaneously to the maintaining of the first IEEE 802.11 communication link, a second IEEE 802.11 communication link in accordance with the IEEE 802.11 communication specification, the second transceiver comprising second physical layer electronics configured to maintain the physical layer of the second 802.11 communication link, wherein no portion of the first physical layer electronics forms a portion of the second physical layer electronics; and
a housing, wherein at least portion of the first physical layer electronics and at least a portion of the second physical layer electronics are disposed within the housing.

2. The mobile wireless communication device of claim 1, wherein the physical layer of the first IEEE 802.11 link is defined by a first subsection of the IEEE 802.11 and the physical layer of the second IEEE 802.11 link is defined by a second subsection of the IEEE 802.11 specification different from the first subsection.

3. The mobile wireless communication device of claim 2, wherein the first transceiver is configurable between a plurality of configurations wherein each configuration can maintain the first communication link in accordance with one of the IEEE 802.11 communication standard subsections and wherein the second transceiver is configurable between another plurality of configurations wherein each configuration of the another plurality can maintain the second communication link in accordance with one of the IEEE 802.11 communication standard subsections.

4. The mobile wireless communication device of claim 2, wherein the first subsection is 802.11a and the second subsection is 802.11g.

5. The mobile wireless communication device of claim 2, wherein the first subsection defines channels within a 2.4 GHz frequency band and the second subsection defines channels within a 60 GHz frequency band.

6. The mobile wireless communication device of claim 1, wherein the second physical layer electronics are a replica of the first physical layer electronics.

7. The mobile wireless communication device of claim 1, wherein:
the first physical layer electronics comprise a plurality of physical layer resources, each physical layer resource configured to execute an operation for implementing the physical layer; and
the second physical layer electronics comprise another plurality of physical layer resources, each of the another plurality of physical layer resources configured to execute an operation for implementing the physical layer, wherein no physical layer resource is used to maintain the first 802.11 communication link and the second 802.11 communication link.

8. The mobile wireless communication device of claim 1, wherein the first transceiver is configured to maintain the first 802.11 communication link with a first access point and the second transceiver is configured to maintain the second 802.11 communication link with a second access point.

9. The mobile wireless communication device of claim 1, wherein the first physical layer electronics comprise first radio frequency electronics, a first analog to digital converter, first channel estimation electronics, and first demodulation electronics and the second physical layer electronics comprise second radio frequency electronics, a second analog to digital converter, second channel estimation electronics, and second demodulation electronics.

10. The mobile wireless communication device of claim 9, wherein the first radio frequency electronics comprise first filtering electronics, first low noise amplifier electronics and first frequency down conversion electronics and the second radio frequency electronics comprise second filtering electronics, second low noise amplifier electronics and second frequency down conversion electronics.

11. The mobile wireless communication device of claim 9, further comprising supporting electronics comprising synchronization electronics configured to perform signal acquisition functions for the first transceiver and the second transceiver.

12. The mobile wireless communication device of claim 11, wherein the synchronization electronics are further configured to perform signal tracking functions for the first transceiver and the second transceiver 13. The mobile wireless communication device of claim 1, wherein the first physical layer electronics comprise first radio frequency electronics, a first digital to analog converter, and first modulation electronics and the second physical layer electronics comprise second radio frequency electronics, a second digital to analog converter, and second modulation electronics.

14. The mobile wireless communication device of claim 13, wherein the first radio frequency electronics comprise first filtering electronics, first power amplifier electronics and first frequency up conversion electronics and the second radio frequency electronics comprise second filtering electronics, second power amplifier electronics and second frequency up conversion electronics.

15. A method performed by a mobile wireless communication device, the method comprising:
maintaining, with a first transceiver, a first Institute of Electrical and Electronic Engineers (IEEE) 802.11 communication link in accordance with a IEEE 802.11 communication specification defining at least a physical layer, the maintaining the first IEEE 802.11 communication link comprising maintaining the physical layer of the first 802.11 communication link with first physical layer electronics at least partially disposed within a housing;
maintaining, with a second transceiver and simultaneously to the maintaining of the first IEEE 802.11 communication link, a second IEEE 802.11 communication link in accordance with the IEEE 802.11 communication specification, the maintaining the second IEEE communication link comprising maintaining the physical layer of the second 802.11 communication link with second physical layer electronics at least partially disposed within the housing, wherein no portion of the first physical layer electronics forms a portion of the second physical layer electronics.

16. The method of claim 15, wherein maintaining the physical layer of the first IEEE communication link comprises maintaining the physical layer of the first IEEE communication link with at least first radio frequency electronics, a first analog to digital converter, first channel estimation electronics, and first demodulation electronics and wherein maintaining the physical layer of the second IEEE communication link comprises maintain the physical layer of the second IEEE communication link with second radio frequency electronics, a second analog to digital converter, second channel estimation electronics, and second demodulation electronics.

17. The method of claim 16, wherein the first radio frequency electronics comprise first filtering electronics, first low noise amplifier electronics and first frequency down conversion electronics and the second radio frequency electronics comprise second filtering electronics, second low noise amplifier electronics and second frequency down conversion electronics.

18. The method of claim 15, further comprising:
performing signal acquisition functions using supporting electronics to maintain the first IEEE communication link and the second IEEE communication link, wherein no portion of the supporting electronics is part of the first physical layer electronics or the second physical layer electronics.

19. The method of claim 18, further comprising:
performing signal tracking functions using the supporting electronics to maintain the first IEEE communication link and the second IEEE communication link.

20. The method of claim 15, wherein the first physical layer electronics comprise first radio frequency electronics, a first digital to analog converter, and first modulation electronics and the second physical layer electronics comprise second radio frequency electronics, a second digital to analog converter, and second modulation electronics.

* * * * *